(12) United States Patent
Gutierrez et al.

(10) Patent No.: US 9,459,605 B2
(45) Date of Patent: Oct. 4, 2016

(54) ANALYZING HARDWARE OF A TURBINE CONTROLLER

(71) Applicant: General Electric Company, Schenectady, NY (US)

(72) Inventors: Lidia Argelia Gutierrez, Queretaro (MX); Luis Alberto Reyes, Queretaro (MX)

(73) Assignee: General Electric Company, Schenectady, NY (US)

( * ) Notice: Subject to any disclaimer, the term of this patent is extended or adjusted under 35 U.S.C. 154(b) by 312 days.

(21) Appl. No.: 14/052,140

(22) Filed: Oct. 11, 2013

(65) Prior Publication Data

US 2015/0105922 A1 Apr. 16, 2015

(51) Int. Cl.
| | | |
|---|---|---|
| *G05B 15/02* | (2006.01) | |
| *G05B 19/042* | (2006.01) | |
| *G06Q 10/06* | (2012.01) | |
| *G06Q 50/04* | (2012.01) | |

(52) U.S. Cl.
CPC ............. *G05B 15/02* (2013.01); *G05B 19/042* (2013.01); *G06Q 10/0639* (2013.01); *G06Q 50/04* (2013.01); *Y02P 90/30* (2015.11)

(58) Field of Classification Search
CPC .... G05B 15/02; G05B 19/042; G06Q 50/04; G06Q 10/0639; Y02P 90/30
USPC .......................................................... 700/287
See application file for complete search history.

(56) References Cited

U.S. PATENT DOCUMENTS

| | | | | |
|---|---|---|---|---|
| 5,191,534 | A * | 3/1993 | Orr ......................... | G06Q 10/06 348/525 |
| 6,343,251 | B1 * | 1/2002 | Herron ..................... | G07C 3/00 701/100 |
| 7,340,319 | B2 * | 3/2008 | Hawman ................. | G06Q 10/06 700/115 |
| 7,734,847 | B2 | 6/2010 | Wagh et al. | |
| 8,407,111 | B2 * | 3/2013 | Bernardy ........... | G05B 23/0267 235/385 |
| 2006/0100934 | A1 | 5/2006 | Burr et al. | |
| 2010/0280872 | A1 * | 11/2010 | Scholte-Wassink | G06Q 10/06311 705/7.13 |
| 2012/0253996 | A1 * | 10/2012 | Bernardy ........... | G05B 23/0267 705/28 |
| 2013/0006408 | A1 | 1/2013 | Zakrzwski et al. | |

OTHER PUBLICATIONS

European Search Report and Opinion issued in connection with corresponding EP Application No. 14188206.8 on Mar. 8, 2016.

* cited by examiner

*Primary Examiner* — Charles Kasenge
(74) *Attorney, Agent, or Firm* — Greenberg Traurig, LLP

(57) ABSTRACT

A system for analyzing hardware of a turbine controller includes a user interface to receive a user input. The system further includes a turbine controller analysis assembly configured to generate a representation of information corresponding to devices and signals of the turbine controller based on receiving a first query from the user interface and a turbine controller selection from the user interface. The turbine controller analysis assembly is further configured to generate a representation of a bill of materials to modify the turbine controller with a first turbine controller modification module based on receiving from the user interface a first data module selection signal corresponding to the first turbine controller modification module.

17 Claims, 14 Drawing Sheets

ANALYZING HARDWARE OF A TURBINE CONTROLLER

BACKGROUND OF THE INVENTION

The subject matter disclosed herein relates to turbine controllers and in particular to analyzing the hardware associated with the turbines and turbine controllers that control operation of the turbines.

Turbine systems, such as systems based on gas turbines, include various turbine modules that interact with the turbine to operate the turbine. Fuel modules, combustion modules, air intake modules, exhaust modules, recirculation modules or any other turbine modules may be connected to the turbine to control or modify various aspects of the turbine operation. For example, different turbine fuel modules may be connected to the turbine to provide different types of fuel to the turbine. One turbine may be converted from a dual fuel unit (e.g., gas and liquid fuels) to a gas-only fuel unit. The different turbine modules require different physical connections of tubes, electrical control lines or connectors, housings and other physical connections. In addition, a turbine controller that controls operation of the turbine needs to be updated to control the different turbine modules. When a turbine is physically converted from a dual-fuel unit to a single-fuel unit, one or both of the hardware and software in the turbine controller needs to be updated to control the single-fuel unit.

Some turbine controllers have limited memory or limited input/output (I/O) data connectors to connect the turbine controller to the turbine and turbine modules. Accordingly, it may be difficult to determine which turbine modules may be connected to a turbine of a turbine system and which modifications may be made to the turbine system.

BRIEF DESCRIPTION OF THE INVENTION

According to one aspect of the invention a system for providing turbine controller configuration information includes a user interface to receive a user input. The system further includes a turbine controller analysis assembly configured to generate a representation of information corresponding to devices and signals of a turbine controller based on receiving a first query from the user interface and a turbine controller selection from the user interface. The turbine controller analysis assembly is further configured to generate a representation of a bill of materials to modify the turbine controller with a first turbine controller modification module based on receiving from the user interface a first data module selection signal corresponding to the first turbine controller modification module.

According to another aspect of the invention, a non-transitory computer-readable medium has stored thereon computer code for controlling a computing system including at least one processor and memory to perform a method. The method includes generating, by the at least one processor, a representation of information corresponding to devices and signals of a turbine controller based on receiving a first query from a user interface and a turbine controller selection from the user interface. The method further includes generating, by the at least one processor, a representation of a bill of materials to modify the turbine controller with a first turbine controller modification module based on receiving from the user interface a first data module selection signal corresponding to the first turbine controller modification module.

According to yet another aspect of the invention, a method of controlling a turbine controller analysis assembly includes generating, by at least one processor, a representation of information corresponding to devices and signals of a turbine controller based on receiving a first query from a user interface and a turbine controller selection from the user interface. The method further includes generating, by the at least one processor, a representation of a bill of materials to modify the turbine controller with a first turbine controller modification module based on receiving from the user interface a first data module selection signal corresponding to the first turbine controller modification module.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Conventional turbine systems and turbine controller analysis systems require that users have detailed knowledge of a turbine controller, or conduct extensive research about the controller, to make changes to a turbine controller. Embodiments of the invention encompass methods, systems, devices and computer program products that provide users with an interface to obtain information about turbine systems and turbine controllers, and to generate and organize data to facilitate ready modification of the turbine systems or turbine controller.

Figure 1:
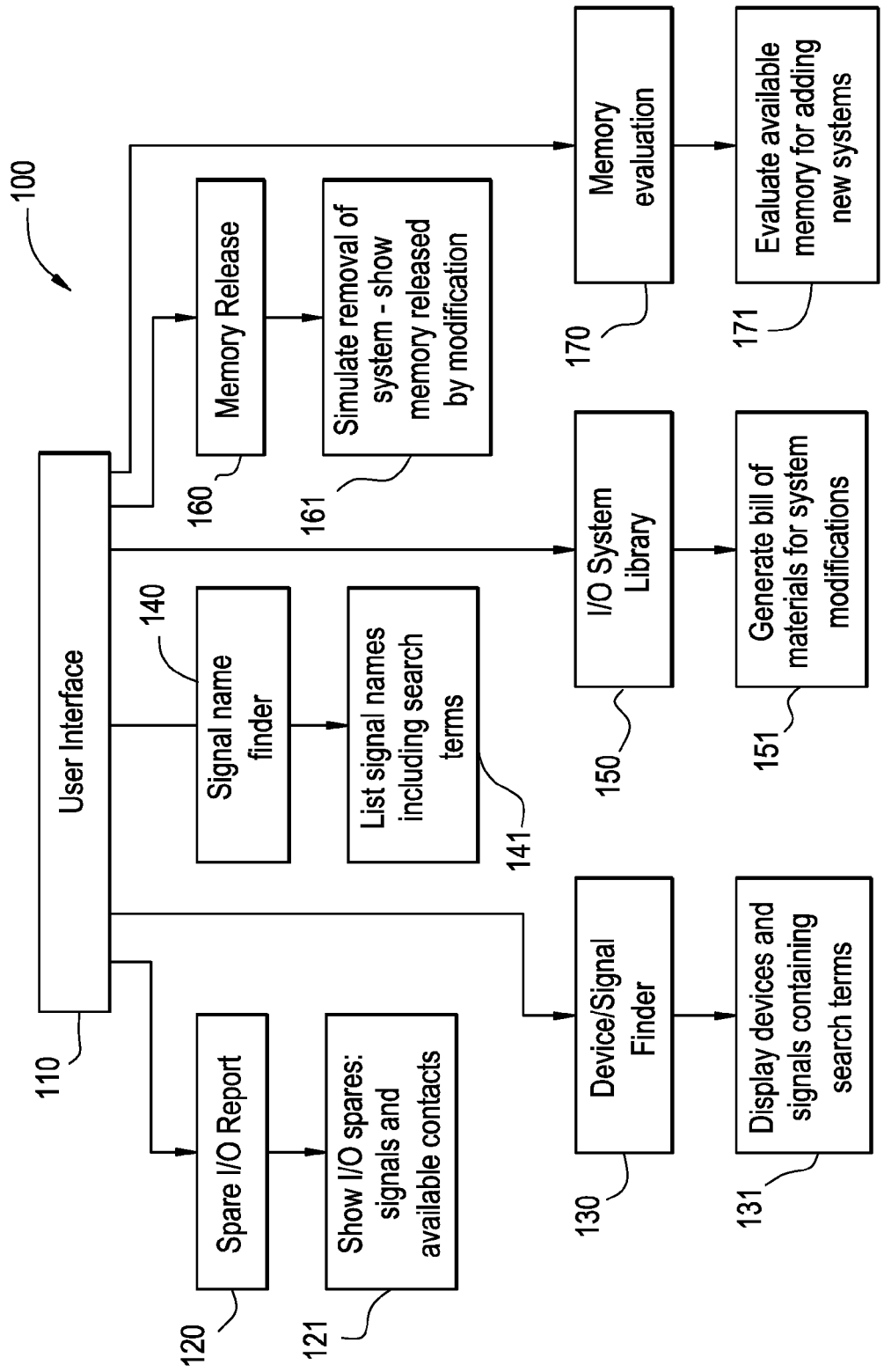
FIG. 1 illustrates a flow diagram of a method for selecting functions of a turbine analysis assembly according to an embodiment of the invention.

FIG. 1 illustrates a functional block diagram 100 for selecting functions of a turbine analysis assembly according to an embodiment of the invention. A user interacts with a user interface 110 to select various functions to be performed. The available functions include a spare input/output (I/O) report function 120, a device/signal finder function 130, a signal name finder function 140, an I/O system library function 150, a memory release function 160, and a memory evaluation function 170.

Figure 2:
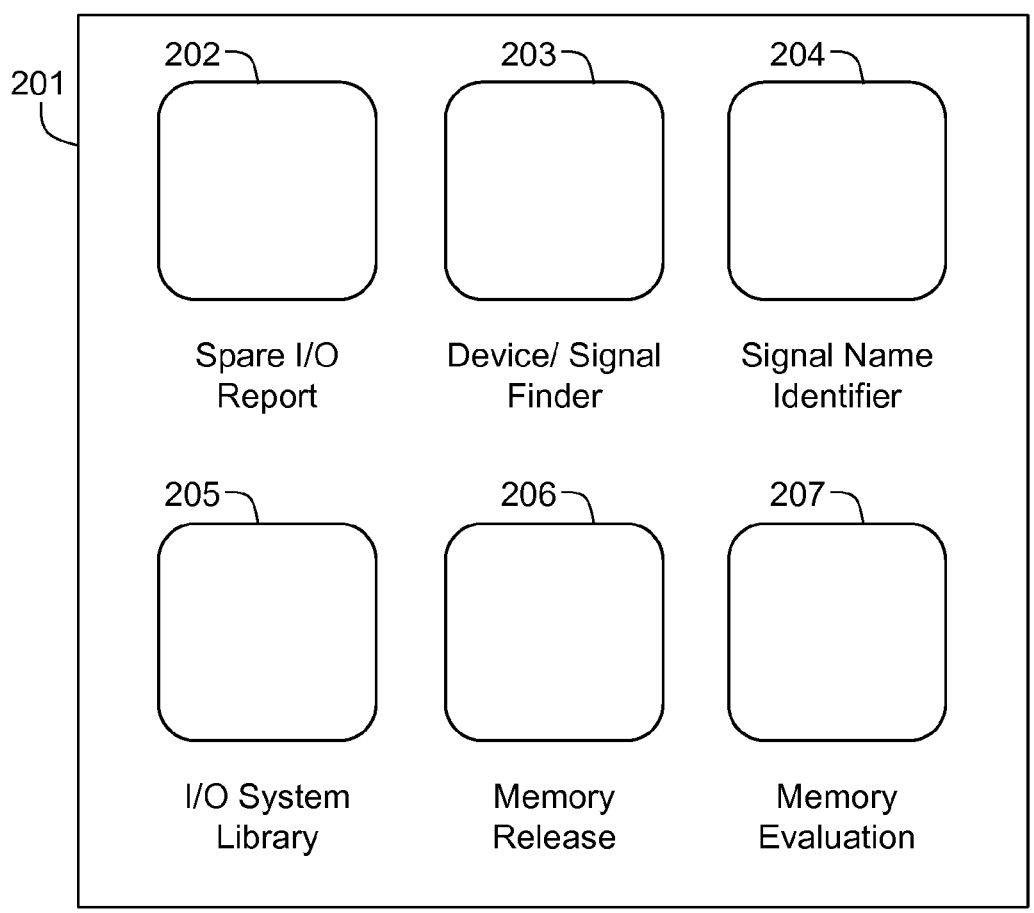
FIG. 2 illustrates a system for analyzing a turbine controller according to an embodiment of the invention.

FIG. 2 illustrates an example of a user interface display 201. A user interacts with the user interface display to select each respective function. The user interface display includes icons 202-207. Each function may be selected by clicking on a respective icon 202-207 with a mouse icon or other graphical user interface (GUI) item selection icon. In addition, each function may be selected by dragging a file that is desired to be analyzed onto the respective function. For example, in an embodiment in which a user wishes for an analysis to be performed of a turbine controller, the user may drag an icon of a turbine controller onto a respective function selection icon, and the function may be performed on the data corresponding to the turbine controller. While a visual display is illustrated in FIG. 2, embodiments of the invention encompass any type of user interface, including tactile, audible and any other type of user interface. In such embodiments, elements that are represented as icons in a visual user interface may instead be represented as physical features, audible tones or sounds, etc.

Figure 3:
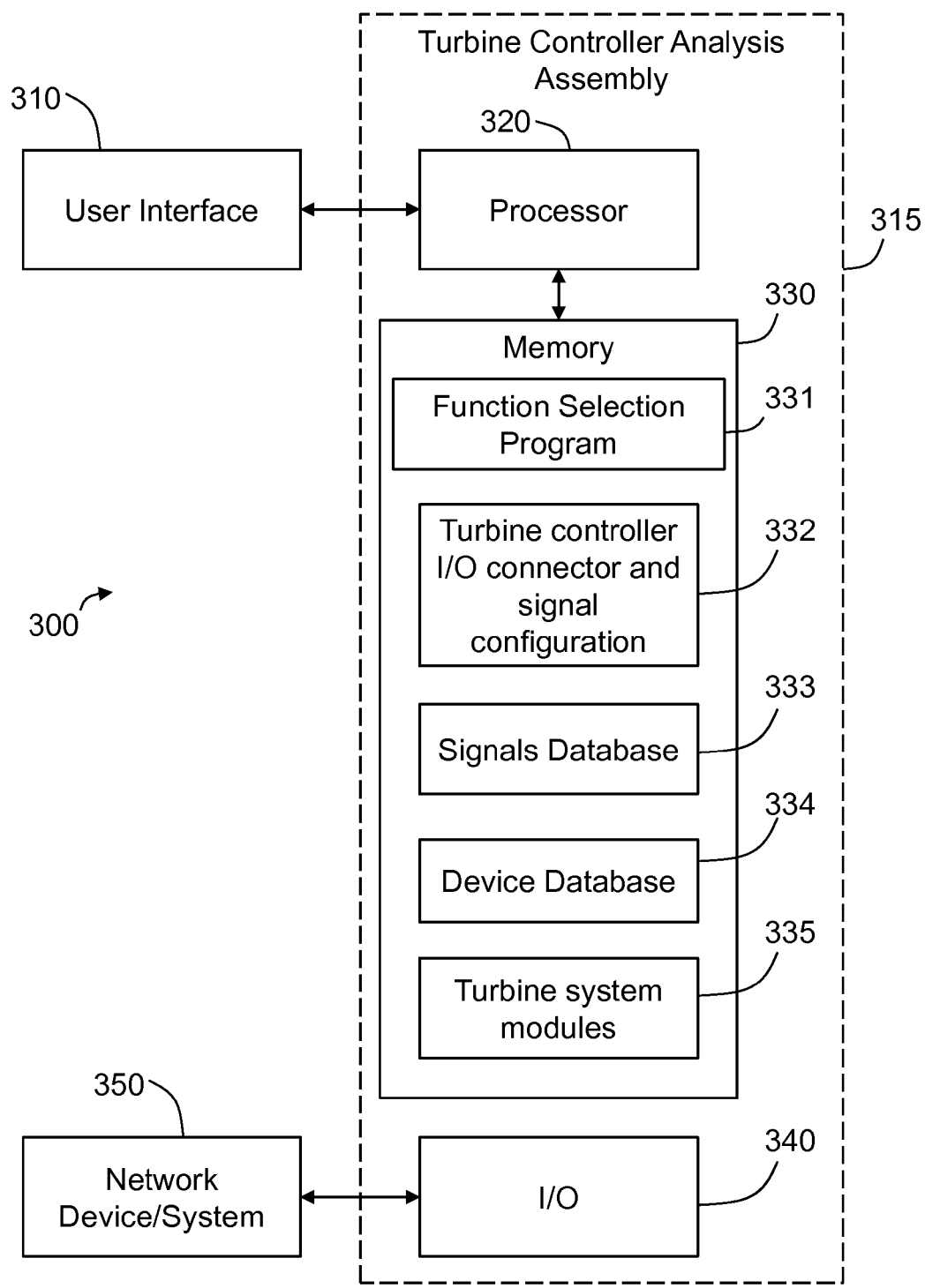
FIG. 3 illustrates a function selection screen of a user interface according to an embodiment of the invention.

The blocks illustrated in FIG. 1 may represent processes executed by the system 300 of FIG. 3 for analyzing a turbine controller and for providing turbine controller configuration information. The blocks of FIG. 1 may also represent hardware modules for executing particular functions. For example, the spare I/O report block 120 may represent physical memory storing instructions which are executed by a processor to generate a spare I/O report. Similarly, the device/signal finder block 130, the signal name finder block 140, the I/O system library block 150, the memory release block 160, and the memory evaluation block 170 may all represent different memory chips or segments of physical memory in one or more memory chips that store instructions executable by a processor to perform the respective functions.

When the spare I/O report function is selected in block 120, a report is generated and displayed in block 121 that shows spare or unused I/O connections and signals of a predetermined turbine system. In one embodiment, the spare I/O function is selected by dragging an icon representing a turbine controller, or representing a turbine controller data file, on a display of the user interface onto an icon representing the spare I/O function.

Figure 4:
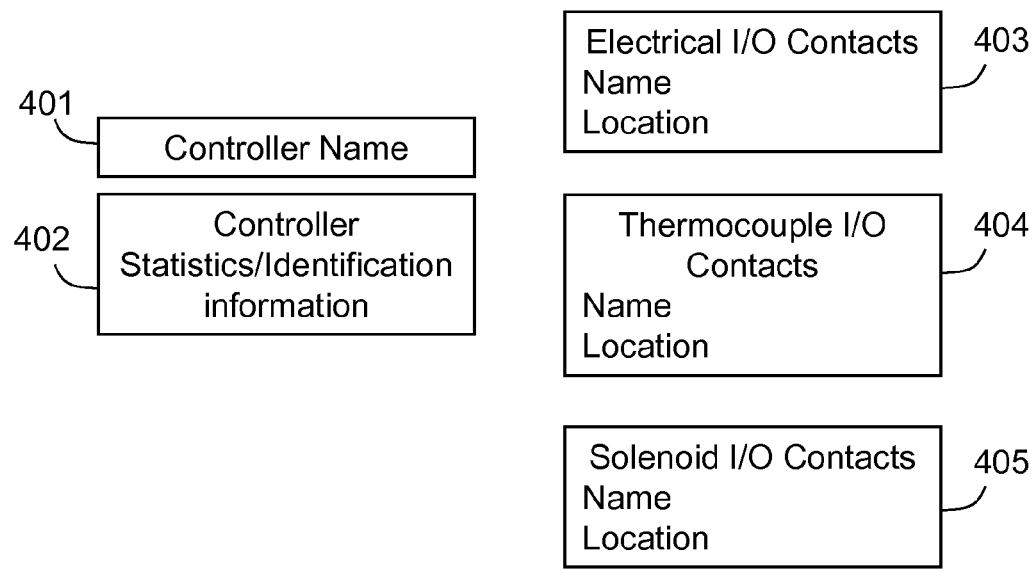
FIG. 4 illustrates a spare I/O report screen according to an embodiment of the invention.

An example of a spare I/O report is illustrated in FIG. 4. The report includes the name 401 of the controller being analyzed and any statistics or identification information 402, such as serial numbers, model number, total number of available contacts, or any other information. The report also includes the names and locations of available electrical I/O contacts 403, thermocouple I/O contacts 404, and solenoid I/O contacts 405. Although a few examples of I/O contacts are provided, embodiments of the invention encompass reports including any type of I/O contact. In one embodiment, the sections 403, 404 and 405 include information regarding unavailable I/O contacts as well as available contacts. For example, a turbine controller analysis assembly (such as the assembly 315 of FIG. 3) may analyze a data file corresponding to a turbine controller and may determine that out of twenty total electrical I/O contacts, ten are connected and thus unavailable, while ten are unconnected and thus available. Accordingly, the spare I/O report may include the names and locations of the connected electrical I/O contacts as well as an indicator that they are connected and unavailable. The spare I/O report may further include the names and locations of the unconnected electrical I/O contacts, as well as an indicator that they are unconnected and available.

Figure 5:
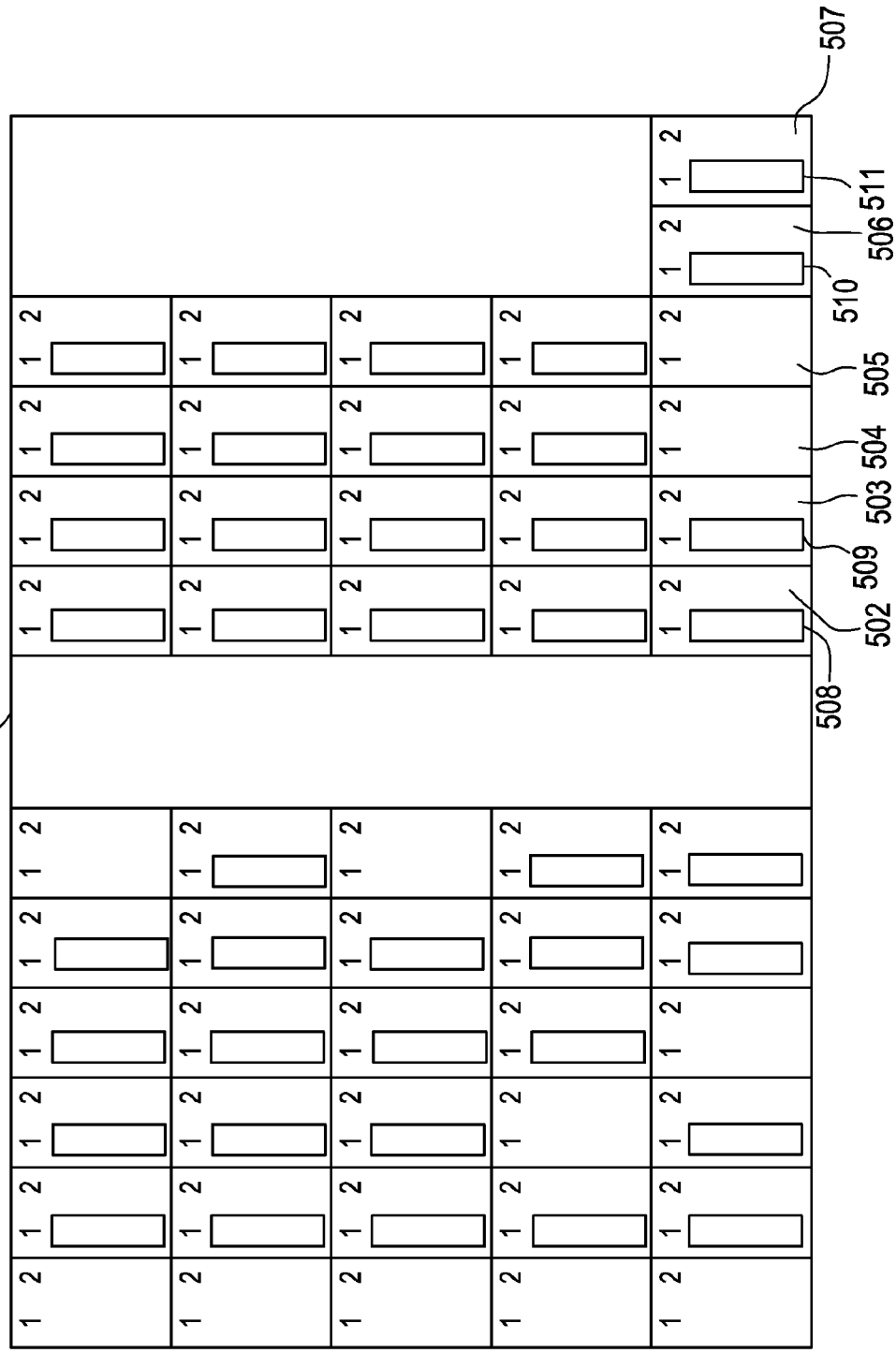
FIG. 5 illustrates a spare I/O report screen according to another embodiment of the invention.

In one embodiment illustrated in FIG. 5, the turbine controller analysis assembly (such as the assembly 315 of FIG. 3) generates display information to display a graphical representation of a physical cabinet and spare slots available to mount a terminal board, or a turbine controller modification module. Referring to FIG. 5, the physical cabinet is represented by a rectangular shape 501 that may mimic the actual shape of the physical cabinet. Individual I/O slots are represented by the rectangular shapes 502-507, and connected or unavailable slots are represented by the rectangular shapes 508-511. Available slots 504 and 505 are indicated by the absence of a rectangular shape 508-511.

Figure 6:
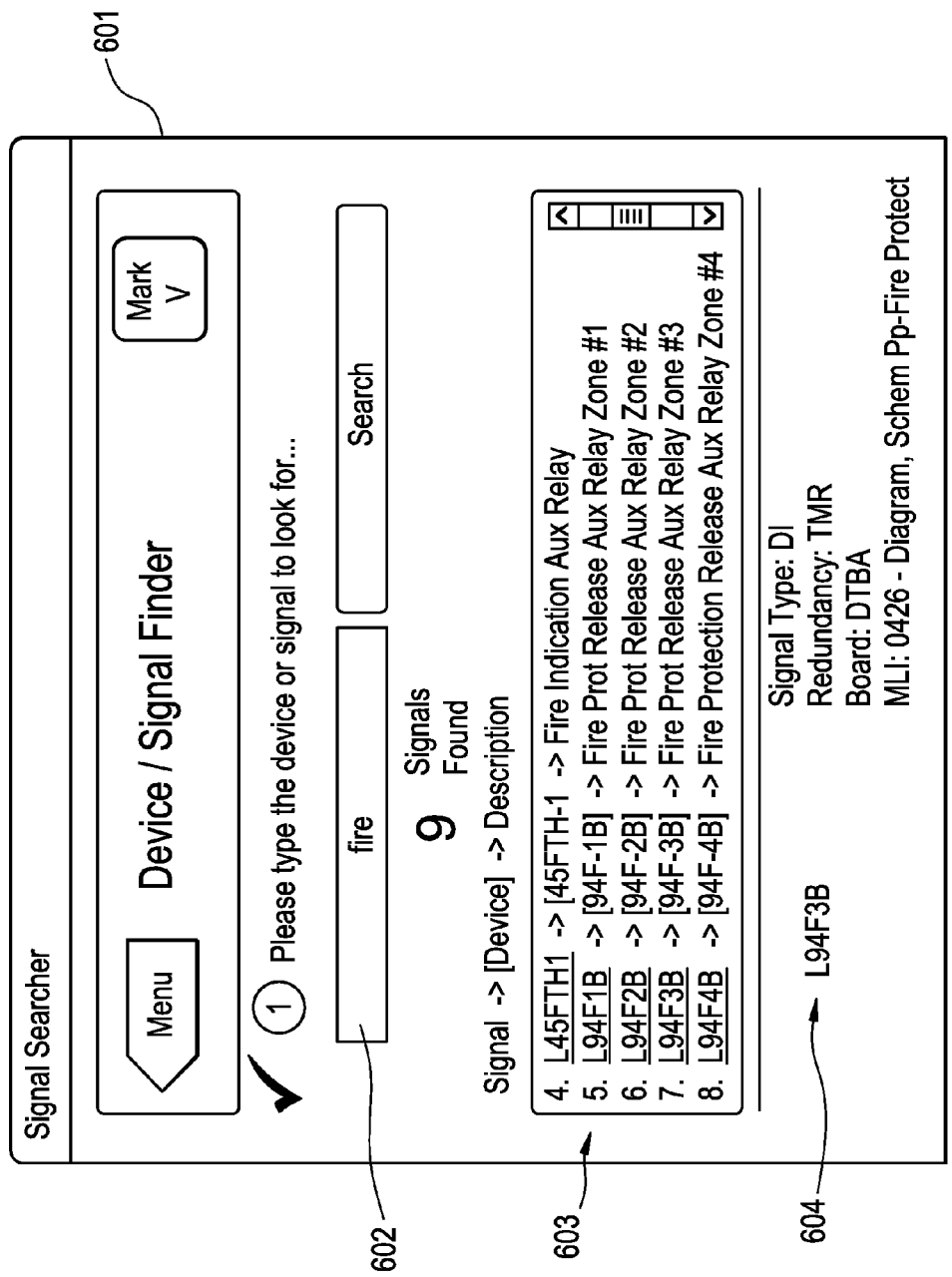
FIG. 6 illustrates a device and signal query screen according to an embodiment of the invention.

Referring again to FIG. 1, a user interacts with the user interface 110 to select the device and signal finder module 130. As a result, devices and signals including search terms entered by the user are displayed in block 131. In one embodiment, the device and signal finder function is selected by dragging an icon representing a turbine controller modification module, or representing a turbine controller modification module data file, on a display of the user interface onto an icon representing the device and signal finder function. Referring to FIG. 6, the turbine controller analysis assembly (such as the assembly 315 of FIG. 3) generates a query window 601 including a search field 602. A user enters one or more characters into the search field, such as by a touch-pad, keyboard, or any other user interface, and corresponding signals and devices 603 are displayed. For example, in one embodiment, each signal and device including the term entered in the search field 602 is displayed. When a user selects one of the signals or devices, detailed information about the signal or device is displayed in a signal/device detail window 604. Detailed information may include a symbol representing the signal or device, a location of the signal or device in one of the turbine, turbine controller or turbine controller modification module, inputs and outputs of a device, a full name of the signal or device, classes or types of the signal or device, or any other desired information.

Figure 7:
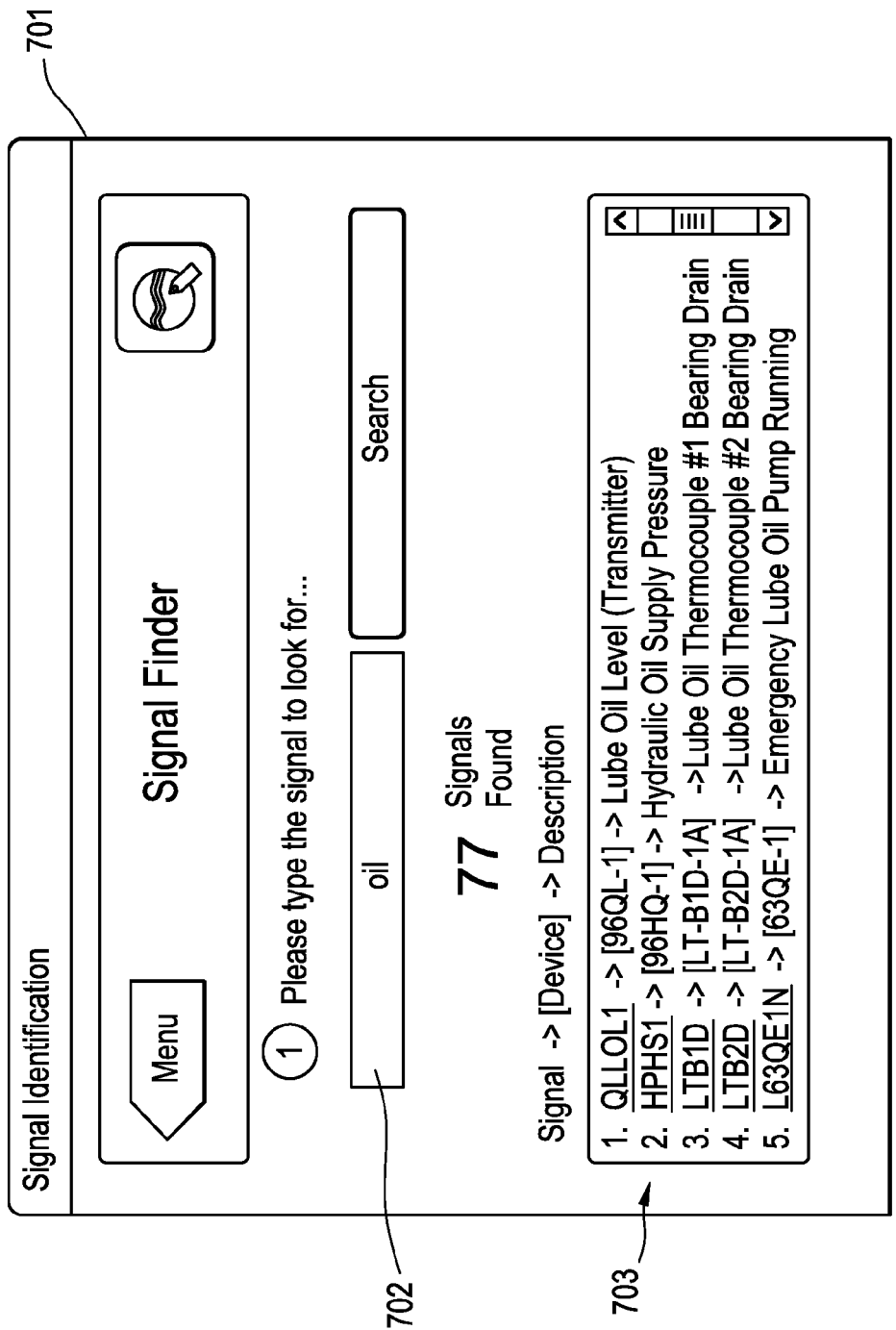
FIG. 7 illustrates a signal query screen according to an embodiment of the invention.

Referring again to FIG. 1, a user interacts with the user interface 110 to select the signal finder module 140. As a result, signals including search terms entered by the user are displayed in block 141. In one embodiment, the finder function is selected by dragging an icon representing a turbine controller modification module, or representing a turbine controller modification module data file, on a display of the user interface onto an icon representing the signal finder function. Referring to FIG. 7, the turbine controller analysis assembly (such as the assembly 315 of FIG. 3) generates a query window 701 including a search field 702. A user enters one or more characters into the search field, such as by a touch-pad, keyboard, or any other user interface, and corresponding signals 703 are displayed. For example, in one embodiment, each signal including the term entered in the search field 702 is displayed. Displaying the signal may include displaying detailed information about the signal, such as a symbol representing the signal, a full name or description of the signal, a location of the signal (i.e. the name of a device that generates the signal or a device that receives the signal as an input), or any other detailed information.

Figure 8:
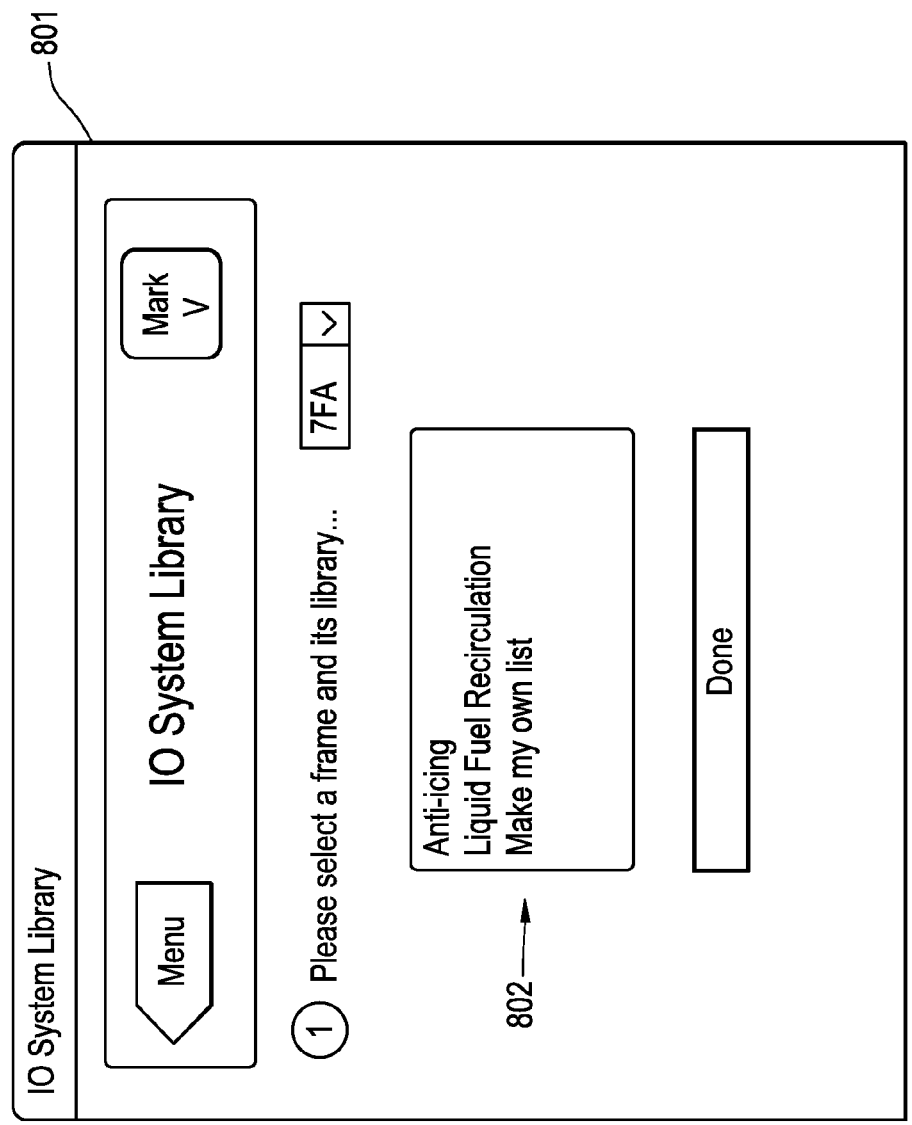
FIG. 8 illustrates an I/O system library selection screen according to an embodiment of the invention.
Figure 9:
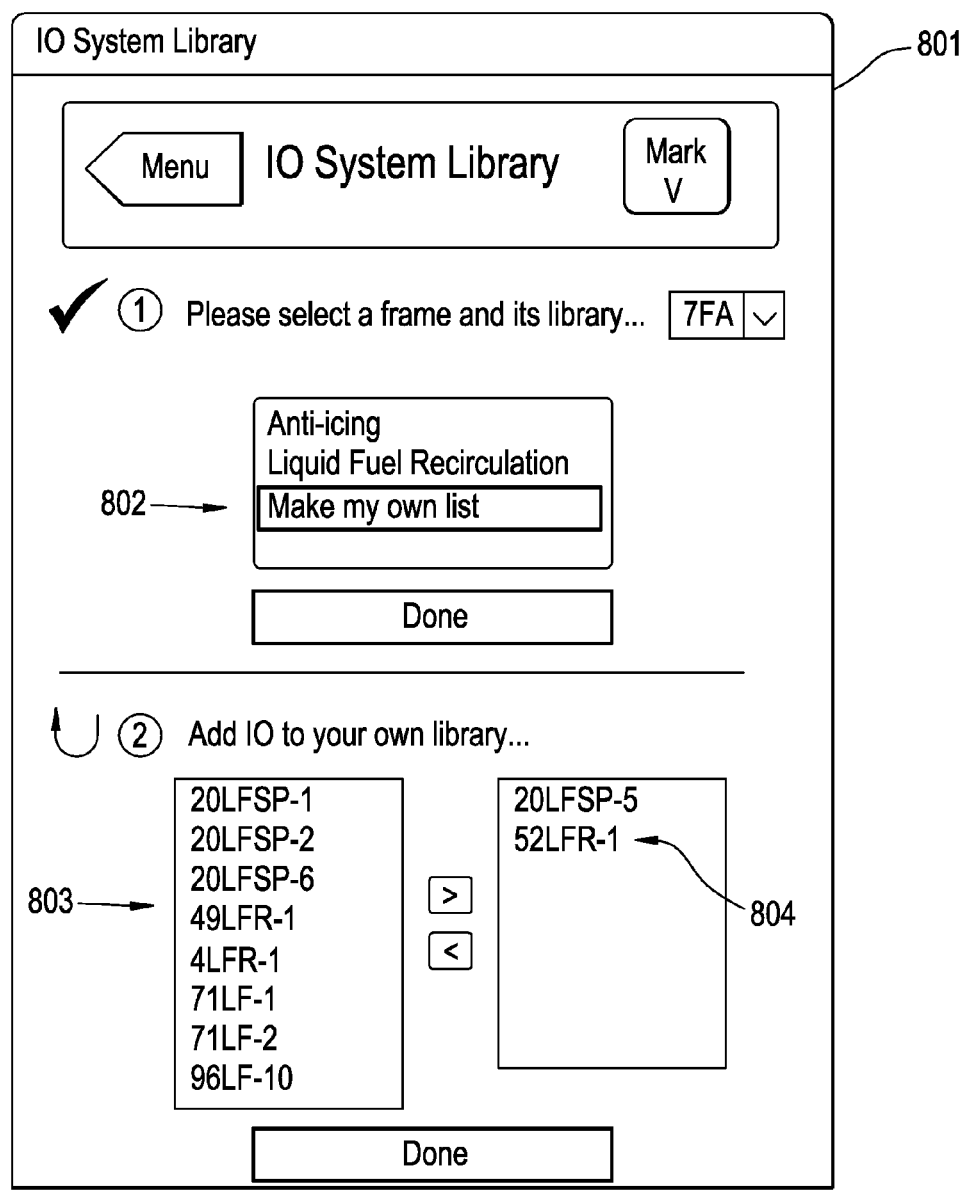
FIG. 9 illustrates an I/O system library selection screen according to another embodiment of the invention.

Referring again to FIG. 1, a user interacts with the user interface 110 to select the I/O system library function 150. As a result, an I/O system library screen including a bill of materials to perform a modification is generated in block 151. In one embodiment, the I/O system library function is selected by dragging an icon representing a turbine controller modification module, or representing a turbine controller modification module data file, on a display of the user interface onto an icon representing the I/O system library function. Similarly, an icon representing a turbine controller, or representing a turbine controller data file, may be dragged on a display of the user interface onto an icon representing the I/O system library function. In yet another embodiment, a user selects the I/O system library icon, and a selection screen is displayed to allow the user to select the controller or controller modification module to be analyzed. Referring to FIG. 8, the turbine controller analysis assembly (such as the assembly 315 of FIG. 3) generates a query window 801 including a list of systems or libraries 802 to be analyzed. Alternatively, a user may enter one or more characters into a search field, such as by a touch-pad, keyboard, or any other user interface. FIG. 9 illustrates an I/O addition field 803 that allows a user to select one or more devices to add to a system or library to be analyzed. When the user selects one or more devices having I/O connections, the devices are moved to the "selected" field 804. The systems or libraries 802 correspond to turbine controller modification modules, such as modules required to modify turbine controller to control a fuel system of a turbine, a cooling system of a turbine, a recirculation system of a turbine, an exhaust system of a turbine, an intake system of a turbine or any other system that affects operation of the turbine.

When a system or library 802 is selected, the turbine controller analysis assembly (such as the assembly 315 of FIG. 3) performs a comparative analysis of the devices in the selected system or library 802 and the I/O connections and devices of a predetermined turbine controller. In one embodiment, a user may select multiple systems or libraries 802 representing multiple modifications to a turbine and turbine controller. The turbine controller analysis assembly compares the I/O connections of the selected system or library 802 with I/O connections presently configured in the turbine controller to determine the I/O connections required to modify the turbine controller to accommodate the selected systems 802.

Figure 10:
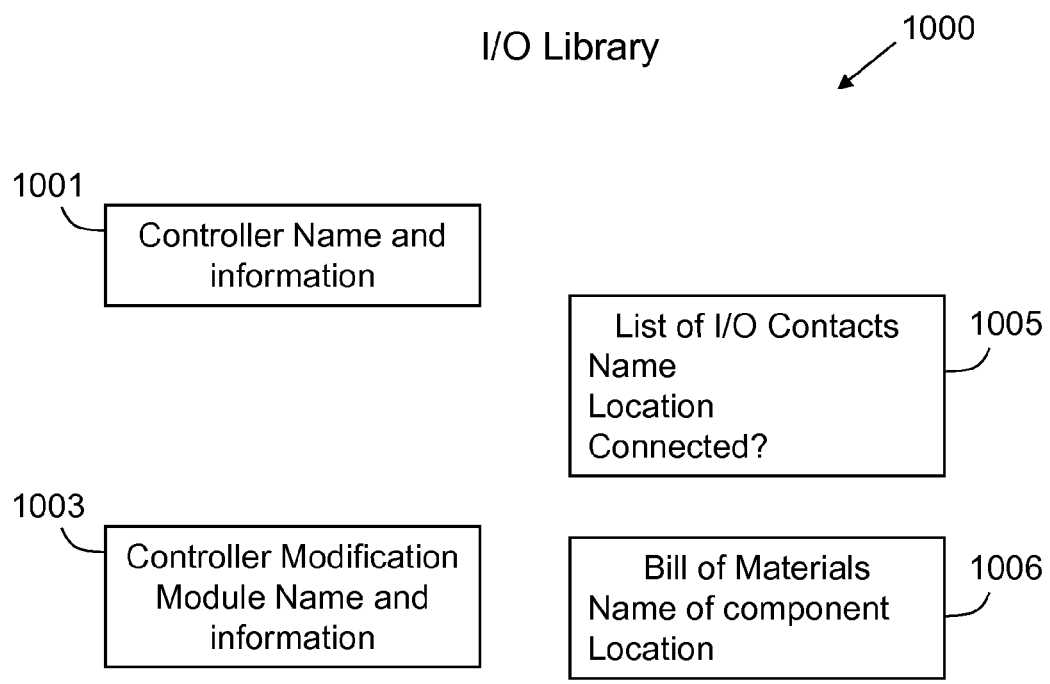
FIG. 10 illustrates an I/O system library bill of materials screen according to an embodiment of the invention.

Upon performing the comparative analysis, the turbine controller analysis assembly generates a bill of materials and displays the bill of materials on the user interface 110. FIG. 10 illustrates an example of the contents of a display screen 1000 including a bill of materials 1006. The I/O library display screen 1000 includes a name of the controller 1001 and any relevant statistics and identification information. The I/O library display screen 1000 also includes the names 1003 of the controller modification modules corresponding to the systems 802 selected by a user to modify a turbine controller, as well as any relevant information about the controller modification modules.

The I/O library display screen 1000 also includes a list 1005 of I/O connections, including the name of the I/O connection, its location, an indication regarding whether the connection is currently connected and whether the connection would need to be modified to accommodate the controller modification modules indicated by the selected systems and libraries 802.

The I/O library display screen 1000 also includes a bill of materials 1006, which lists the names and any other relevant data of devices required to modify the turbine controller with the turbine controller modification modules indicated by the selected systems and libraries 802.

Figure 11:
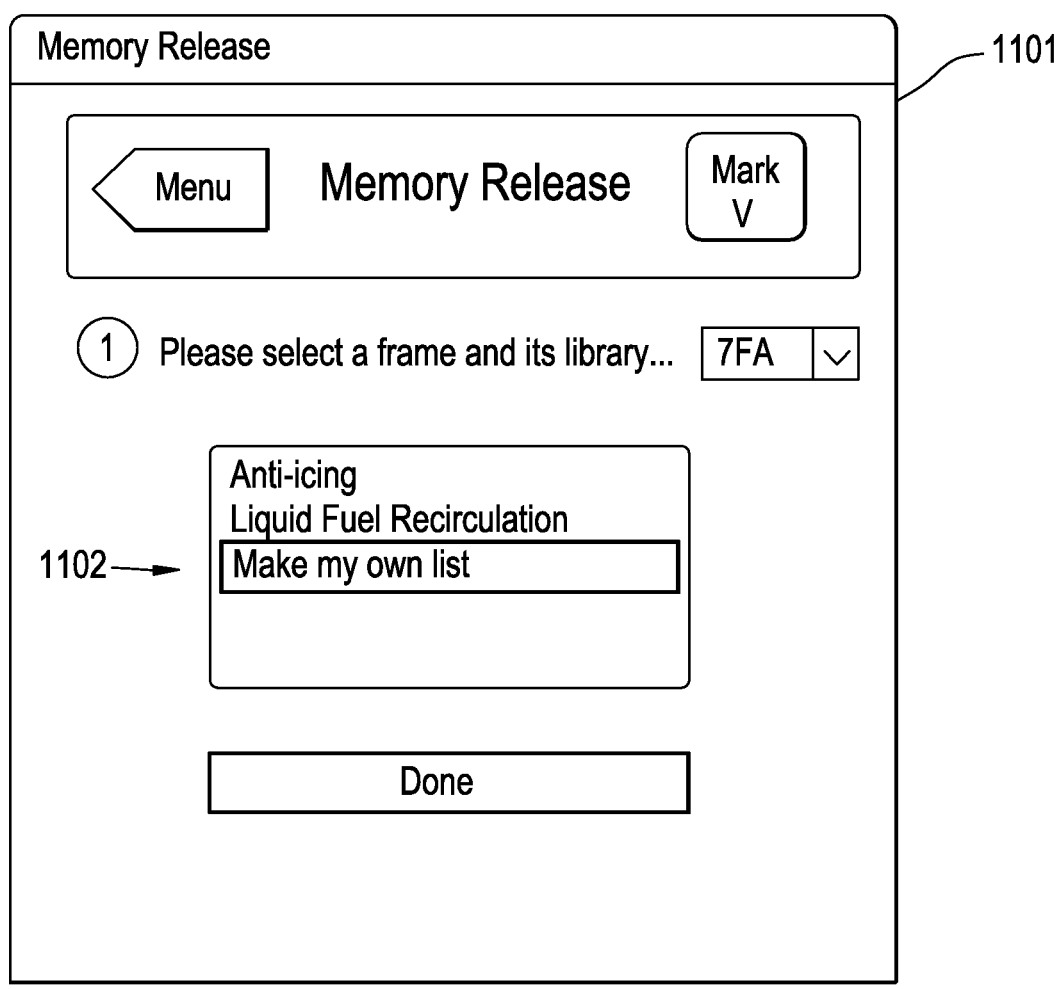
FIG. 11 illustrates a memory release selection screen according to an embodiment of the invention.

Referring again to FIG. 1, a user interacts with the user interface 110 to select the memory release function 160. When the user selects the memory release function 160, the effect of disconnecting a presently-connected system on turbine controller memory and I/O connections is simulated in block 161. Referring to FIG. 11, the turbine controller analysis assembly (such as the assembly 315 of FIG. 3) generates a query window 1101 including a list of systems 1102 that are presently connected to a turbine controller. Alternatively, a user may enter one or more characters into a search field, such as by a touch-pad, keyboard, or any other user interface to select connected systems or modules. The systems 1102 correspond to turbine controller modification modules, such as modules that are connected to a turbine controller to control a fuel system of a turbine, a cooling system of a turbine, a recirculation system of a turbine, an exhaust system of a turbine, an intake system of a turbine or any other system that affects operation of the turbine.

Figure 12:
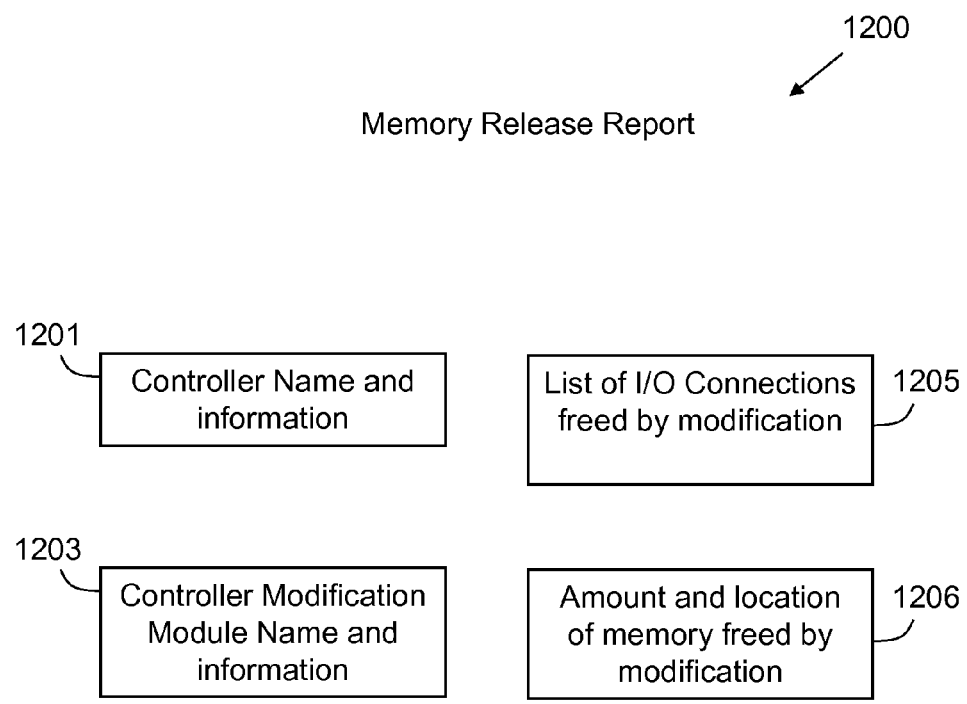
FIG. 12 illustrates a memory release report according to an embodiment of the invention.

When a desired system is selected from the list of systems 1102, the turbine controller analysis assembly generates a report 1200, illustrated in FIG. 12, describing the I/O connections that would be freed based on disconnecting the selected system 1102, as well as the memory in the turbine controller that would be made available by disconnecting the selected system 1102. In particular, the report 1200 includes a section 1201 including the name of the turbine controller and corresponding information about the turbine controller. The report 1200 also includes the name of the controller modification module 1203, corresponding to the selected system 1102 of FIG. 11, that has been selected by a user to be removed in the simulation, as well as any corresponding information about the controller modification module. The report 1200 also includes a section 1205 listing I/O connections of the controller that would be made available by disconnecting the controller modification module from the controller, and a section 1206 including the amount and location of memory in the controller that would be freed by disconnecting the controller modification module.

Figure 13:
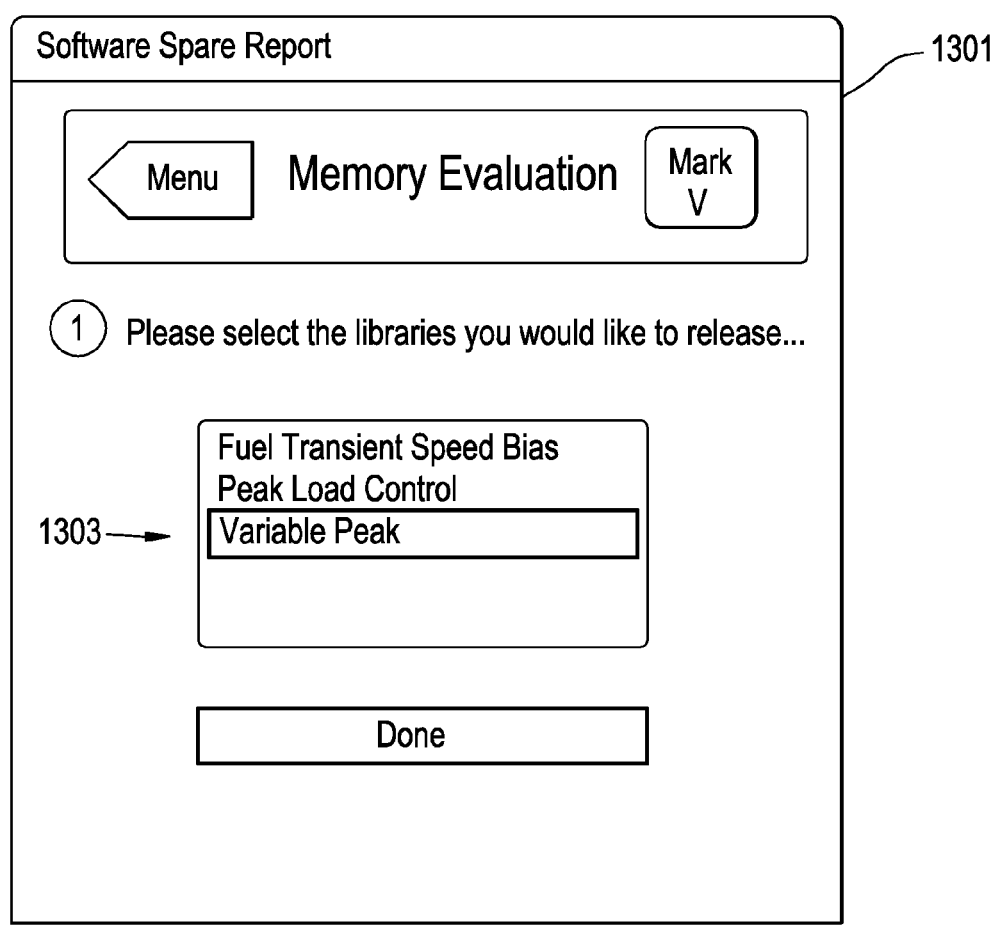
FIG. 13 illustrates a memory analysis selection screen according to an embodiment of the invention.

Referring again to FIG. 1, a user interacts with the user interface 110 to select the memory evaluation function 170. When the user selects the memory evaluation function 170, a report is generated in block 171 showing memory available for adding new systems to a turbine controller. Referring to FIG. 13, the turbine controller analysis assembly (such as the assembly 300 of FIG. 3) generates a query window 1301 including a list of systems 1302 that a user can select to determine if the controller has sufficient memory to have the system 1303 connected to the controller. In one embodiment, the controller is a Mark V controller, which has a limited amount of memory. Alternatively, a user may enter one or more characters into a search field, such as by a touch-pad, keyboard, or any other user interface to select connected systems or modules. The systems 1302 correspond to turbine controller modification modules, such as modules that are connected to a turbine controller to control a fuel system of a turbine, a cooling system of a turbine, a recirculation system of a turbine, an exhaust system of a turbine, an intake system of a turbine or any other system that affects operation of the turbine.

Figure 14:
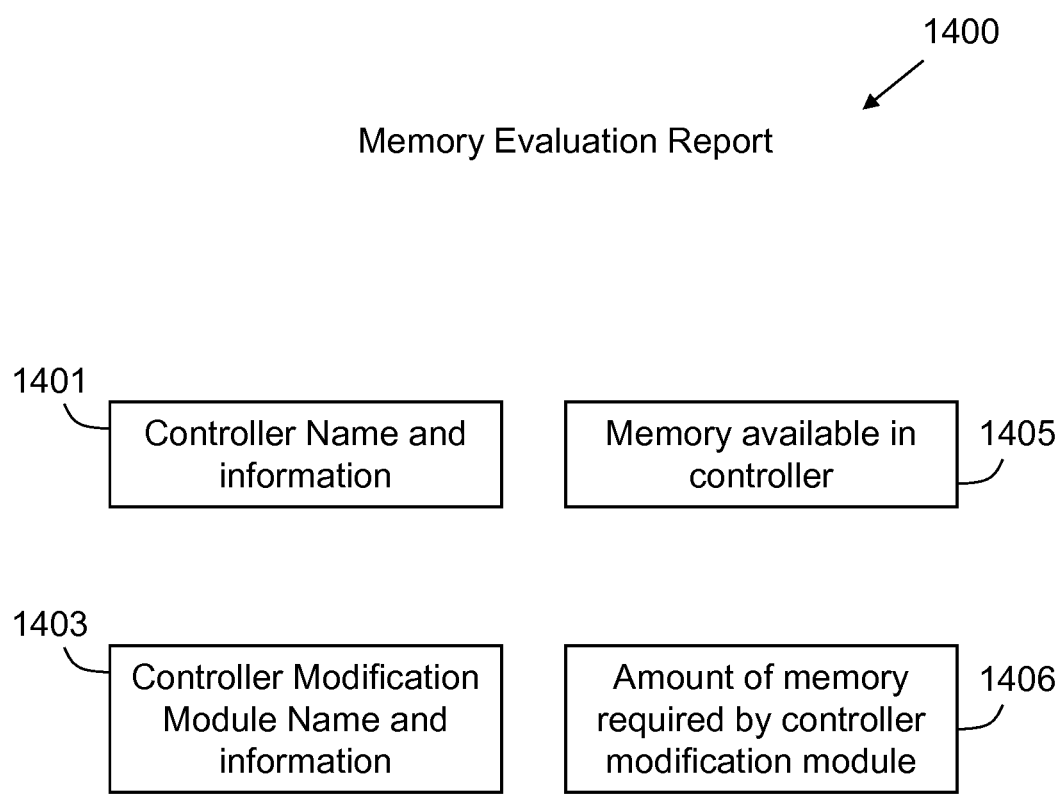
FIG. 14 illustrates a memory analysis report according to an embodiment of the invention.

Referring to FIG. 14, when the system 1302 of FIG. 13 is selected by a user, the turbine controller analysis assembly generates a memory evaluation report 1400. The report 1400 includes the controller name and information 1401 and the name and information of a controller modification module 1403 corresponding to the selected system 1302 of FIG. 13. The report 1400 also includes information regarding the memory available 1405 in the controller and a section 1406 that describes the amount of memory required by the controller modification module 1203. Accordingly, a user may determine whether the selected controller may be modified with a desired controller modification module.

As discussed above, the functional blocks of FIG. 1 correspond to segments of physical memory including instructions and data used by a processor to execute the instructions. FIG. 3 illustrates an example of a system 300 for providing turbine controller configuration information according to an embodiment of the invention. The system 300 includes a user interface 310 and a turbine controller analysis assembly 315. The user interface 310 includes a display device, which may be an electronic display device, a printing medium display device, a tactile display device, an audio output device, or any other device capable of providing data to a user in a form understandable by the user and receiving input from the user to control operation of the turbine controller analysis assembly 315.

The turbine controller analysis assembly 315 includes a processor 320 and memory 330. The memory 330 includes function selection program segments 331 that store function selection programs corresponding to the function selection blocks 120, 221, 230, 131, 140, 141, 150, 151, 160, 161, 170 and 171 of FIG. 1. The turbine controller analysis assembly 315 also includes a turbine controller I/O connector and signal configuration data segment 332, a signals database 333, a device database 334 and a turbine system module data section 335. Each section and database 332, 333, 334 and 335 stores data corresponding to connectors, signals, devices and systems that are accessed and selectable by a user via the user interface 210 to perform an analysis of a turbine controller and turbine controller modification modules.

The turbine controller analysis assembly 315 may be one computer defined by a single computer housing or may include multiple computers connected by a network. For example, while one processor 320 is illustrated in FIG. 3, embodiments of the invention encompass computer systems having any number of processors and any number of memory modules, memory chips or segments within a same memory chip. The memory 330 may include any computer readable medium including volatile and non-volatile memory, solid-state memory, disks, or any other type of computer-readable means for storing data digitally.

The turbine controller analysis assembly 315 may also include an I/O module 340 for exchanging data with a network device or system 350. For example, if a user selects a controller modification module for analysis and the turbine controller analysis assembly 315 does not have information about the controller modification module stored in memory 330, the turbine controller analysis assembly requests data regarding the controller modification module form the network device or system 350.

In embodiments of the invention, a turbine controller analysis assembly provides information to users regarding a presently-configured turbine controller and modification modules that may be connected to the turbine controller to provide additional utility to the turbine controller.

Embodiments include generating a representation of information corresponding to devices and signals of a turbine controller based on receiving a first query from the user interface and a turbine controller selection from the user interface. The information corresponding to the devices and signals of the turbine controller includes a list of each device name and signal name associated with the turbine controller that includes search terms of the first query.

In one embodiment, the user interface is configured to display a first icon representing the turbine controller and a second icon representing a device and signal analysis function. The turbine controller analysis assembly is configured to generate the representation of the information corresponding to the devices and signals of the turbine controller based on the first icon interacting with the second icon on a display device of the user interface.

In one embodiment, the turbine controller analysis assembly is configured to generate a representation of a bill of materials to modify the turbine controller with a first turbine controller modification module based on receiving from the user interface a first data module selection signal corresponding to the first turbine controller modification module. The user interface is configured to display a third icon representing an input/output (I/O) system library and a fourth icon representing the first turbine controller modification module. The turbine controller analysis assembly is configured to generate the representation of the bill of materials based on the third icon interacting with the fourth icon on a display of the user interface.

In one embodiment, the turbine controller analysis assembly is further configured to generate, in response to a first function selection signal generated by the user interface, a representation of information corresponding to available data I/O contacts for transmitting data between the turbine controller and a connected turbine controller modification module, the available data I/O contacts being disconnected from any turbine controller modification module at the time of generation of the first function selection signal.

In one embodiment, the turbine controller analysis assembly is further configured to generate, in response to a second function selection signal generated by the user interface and a second data module corresponding to a second turbine controller modification module, a representation of information corresponding to memory of the turbine controller that would be released based on removing the second data module from data communication contact with the turbine controller.

In one embodiment, the turbine controller analysis assembly is further configured to generate, in response to a third function selection signal generated by the user interface, a representation of information corresponding to memory available in the turbine controller for receiving turbine controller modification module data.

Embodiments of the invention provide a system and method for analyzing turbine controllers. Technical effects of the invention include providing a graphical user interface that allows a user to interact with graphics to provide turbine controller configuration information, reducing the need for particular expertise with the turbine to obtain configuration information and reducing human error by providing a simple user interface controllable by a user to control a computer to generate turbine controller information. The interface further increases the speed with which a turbine controller can be analyzed and modifications to the turbine controller can be analyzed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for analyzing hardware of a turbine controller, the system comprising:
   a user interface to receive a user input; and
   a turbine controller analysis assembly configured to generate a representation of information corresponding to devices and signals of the turbine controller based on receiving a first query from the user interface and a turbine controller selection from the user interface, the turbine controller analysis assembly further configured to generate a representation of a bill of materials to modify the turbine controller with a first turbine controller modification module based on receiving from the user interface a first data module selection signal corresponding to the first turbine controller modification module;
   wherein the user interface is configured to display a first icon representing the turbine controller and a second icon representing a device and signal analysis function, and
   wherein the turbine controller analysis assembly is configured to generate the representation of the information corresponding to the devices and signals of the turbine controller based on the first icon interacting with the second icon on a display of the user interface.

2. The system of claim 1, wherein the user interface is configured to display a third icon representing an input/output (I/O) system library and a fourth icon representing the first turbine controller modification module, and
   the turbine controller analysis assembly is configured to generate the representation of the bill of materials based on the third icon interacting with the fourth icon on a display of the user interface.

3. The system of claim 1, wherein the information corresponding to the devices and signals of the turbine controller includes a list of each device name and signal name associated with the turbine controller that includes search terms of the first query.

4. The system of claim 1, wherein the turbine controller analysis assembly is further configured to generate, in response to a first function selection signal generated by the user interface, a representation of information corresponding to available data I/O contacts for transmitting data between the turbine controller and a connected turbine controller modification module, the available data I/O contacts being defined as data I/O contacts that are disconnected from any turbine controller modification module at the time of generation of the first function selection signal.

5. The system of claim 1, wherein the turbine controller analysis assembly is further configured to generate, in response to a second function selection signal generated by the user interface and a second data module corresponding to a second turbine controller modification module, a representation of information corresponding to memory of the turbine controller that would be released based on removing the second data module from data communication contact with the turbine controller.

6. The system of claim 1, wherein the turbine controller analysis assembly is further configured to generate, in response to a third function selection signal generated by the user interface, a representation of information corresponding to memory available in the turbine controller for receiving turbine controller modification module data.

7. A non-transitory computer-readable medium having stored thereon computer code for controlling a computing system including at least one processor and memory to perform a method, the method comprising:
   generating, by the at least one processor, a representation of information corresponding to devices and signals of a turbine controller based on receiving a first query from a user interface and a turbine controller selection from the user interface;
   generating, by the at least one processor, a representation of a bill of materials to modify the turbine controller with a first turbine controller modification module based on receiving from the user interface a first data module selection signal corresponding to the first turbine controller modification module;
   displaying a first icon representing the turbine controller and a second icon representing a device and signal analysis function; and
   generating the representation of the information corresponding to the devices and signals of the turbine controller based on the first icon with the second icon on a display of the user interface.

8. The computer-readable medium of claim 7, wherein the method further comprises:
   displaying a third icon representing an input/output (I/O) system library and a fourth icon representing the first turbine controller modification module; and
   generating the representation of the bill of materials based on the third icon interacting with the fourth icon on a display of the user interface.

9. The computer-readable medium of claim 7, wherein the information corresponding to the devices and signals of the turbine controller includes a list of each device name and signal name associated with the turbine controller that includes search terms of the first query.

10. The computer-readable medium of claim 7, wherein the method further comprises:
    generating, by the at least one processor in response to a first function selection signal, a representation of information corresponding to available data I/O contacts for transmitting data between the turbine controller and a connected turbine controller modification module, the available data I/O contacts being disconnected from any turbine controller modification module at the time of generation of the first function selection signal.

11. The computer-readable medium of claim 7, wherein the method further comprises:
    generating, in response to a second function selection signal and a second data module corresponding to a second turbine controller modification module, a representation of information corresponding to memory of the turbine controller that would be released based on removing the second data module from data communication contact with the turbine controller.

12. The computer-readable medium of claim 7, wherein the method further comprises:
    generating, in response to a third function selection signal, information corresponding to memory available in the turbine controller for receiving turbine controller modification module data.

13. A method of analyzing hardware of a turbine controller, comprising:
generating, by at least one processor, a representation of information corresponding to devices and signals of the turbine controller based on receiving a first query from a user interface and a turbine controller selection from the user interface;
generating, by the at least one processor, a representation of a bill of materials to modify the turbine controller with a first turbine controller modification module based on receiving from the user interface a first data module selection signal corresponding to the first turbine controller modification module;
displaying, on a display of the user interface, a first icon representing the turbine controller and a second icon representing a device and signal analysis function; and
generating on the display of the user interface the representation of the information corresponding to the devices and signals of the turbine controller based on the first icon interacting with the second icon on the display of the user interface.

14. The method of claim 13, further comprising:
displaying on a display of the user interface a third icon representing an input/output (I/O) system library and a fourth icon representing the first turbine controller modification module; and
generating on the display of the user interface the representation of the bill of materials based on the third icon interacting with the fourth icon on a display of the user interface.

15. The method of claim 13, wherein the information corresponding to the devices and signals of the turbine controller includes a list of each device name and signal name associated with the turbine controller that includes search terms of the first query.

16. The method of claim 13, further comprising:
generating on a display of the user interface a representation of information corresponding to available data I/O contacts for transmitting data between the turbine controller and a connected turbine controller modification module, the available data I/O contacts being disconnected from any turbine controller modification module at the time of generation of the first data module selection signal.

17. The method of claim 13, further comprising:
generating on a display of the user interface, in response to a second function selection signal and a second data module corresponding to a second turbine controller modification module, a representation of information corresponding to memory of the turbine controller that would be released based on removing the second data module from data communication contact with the turbine controller.

* * * * *